Patented Sept. 27, 1938

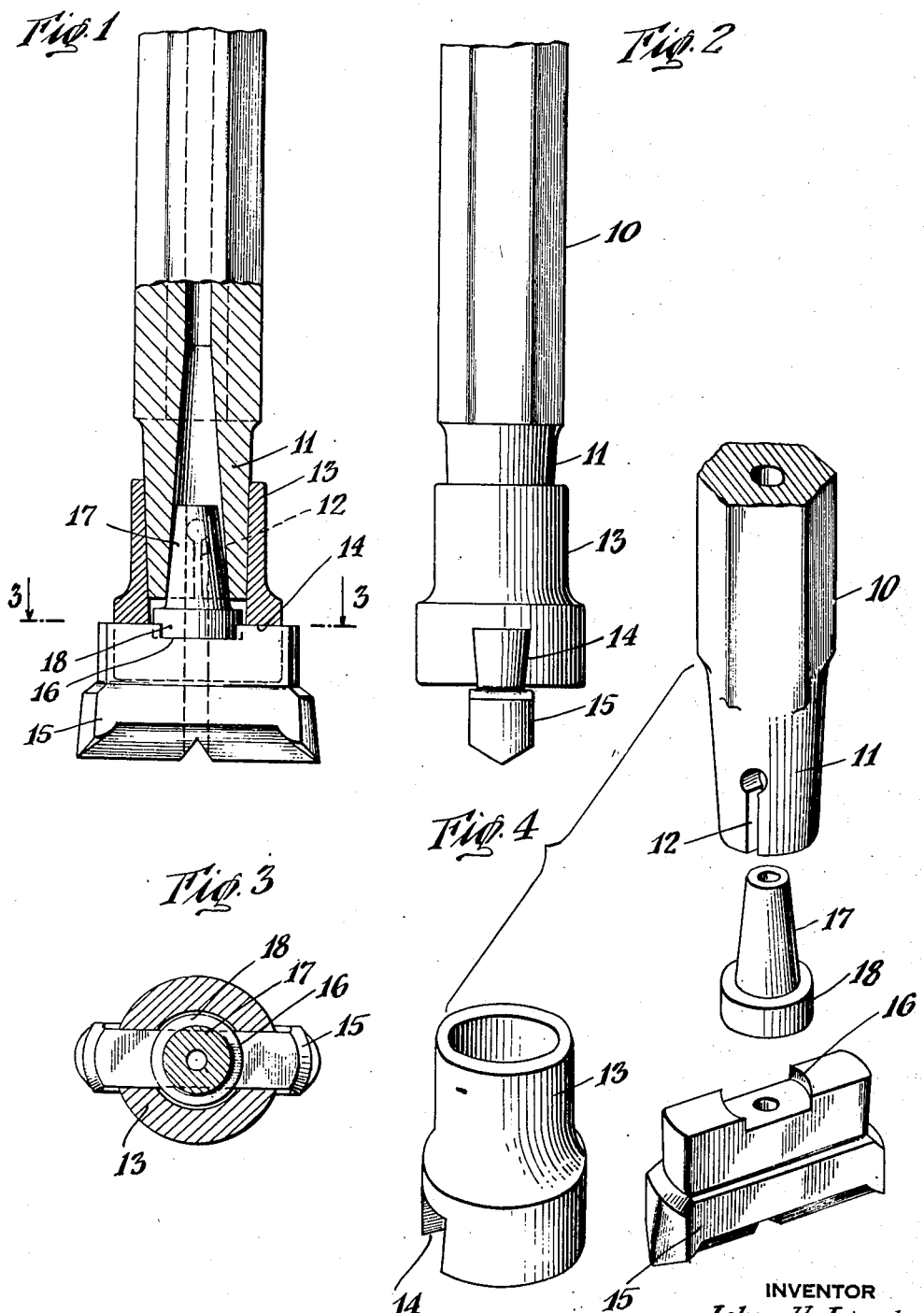

2,131,056

UNITED STATES PATENT OFFICE 2,131,056

DRILL

John Herman Lind, Santa Barbara, Mexico, assignor to American Smelting and Refining Company, New York, N. Y., a corporation of New Jersey Application March 25, 1936, Serial No. 70,747

4 Claims. (Cl. 255—64)

This invention relates to drills such as are ordinarily employed in rock drilling operations and more particularly to certain improvements in detachable drill bits.

Among other features, the invention provides a detachable, two-piece drill bit in which a minimum of material is utilized in the cutting edge proper thus effecting a material saving in those operations that contemplate discarding dulled bits. The invention also provides a novel means for frictionally securing the detachable drill bit to the drill rod.

The invention also consists in certain new and original features of construction and combination of parts hereinafter set forth and claimed.

In the accompanying drawing there is shown for purposes of illustration one form of a device embodying the invention, in which Fig. 1 is a view partly in section showing the assembled drill rod and bit;

Fig. 2 is a view taken at right angles to the assembly shown in Fig. 1;

Fig. 3 is a cross section taken along the line 3—3 of Fig. 1; and

Fig. 4 is a view in perspective of the dismantled device.

Like reference characters denote like parts in the several figures of the drawing.

Referring more particularly to the drawing, 10 is a hollow drill rod having internally and externally tapered end 11; the latter being provided with slit 12. The bit consists of a body portion or collar 13 having a slot 14 and a cutting edge portion 15 provided with recess 16. There is also provided a tapered plug or wedge 17 having head 18.

To assemble the drill, the cutting edge portion 15 is caused to engage the slot 14 of the collar 13 and is locked therein by insertion of the head 18 of plug 17 in the recess 16. The plug 17 is then inserted in the tapered end of the drill rod whereby pressure applied to the cutting edge tends to spread the tapered end 11 of the drill rod thus frictionally engaging the collar 13. To dismantle the bit it is only necessary to give the collar a light sharp blow which causes the tapered plug 17 to slip thus releasing the collar and cutting edge from the end of the drill rod.

In providing the slit 12 for the end of the drill rod to permit expansion of the end of the rod when pressure is applied to the spreader or plug 17, it is highly desirable to drill the end of the drill rod at the furthest extremity of the slot as shown in the drawing to prevent cracking or splitting of the rod in use. While only one type of cutting edge has been shown in the drawing, it will of course be obvious to those skilled in the art that any desired type of cutting edge such as a four-cornered or rosette bit may be used.

It will also be apparent that the present invention provides a drill in which the amount of material used in the cutting edge proper is at a minimum. All other parts of the assembly can, of course, be reused and, therefore, it is only necessary to change the cutting edge when same becomes dull.

What is claimed is:

1. The combination with a drill rod having an internally tapered end, of a recessed cutting portion interlocking a collar portion, said cutting and collar portions being frictionally secured to said drill rod by a tapered plug, the head of said plug engaging the recess of the cutting portion and the tapered portion of said plug engaging the internally tapered end of said drill rod.

2. The combination with a drill rod and a two-piece bit consisting of a body portion and a detachable cutting edge portion, of an additional, single member separate from said rod and bit locking the cutting edge in the body portion of said bit and frictionally securing said body portion to said drill rod.

3. The combination with a drill rod, of a bit comprising a collar and a detachable cutting edge portion interlocking said collar, and a wedge member telescoping the end of said drill rod and frictionally engaging said collar on said rod.

4. The combination with a drill rod having a hollow, tapered end, said end having slits therein, of a detachable collar, a recessed cutting edge portion engaging said collar, and a tapered plug for frictionally securing said collar to said rod, said tapered plug having a head engaging the recess in said cutting edge portion.

JOHN HERMAN LIND.